United States Patent [19]

Koch et al.

[11] Patent Number: 4,778,194
[45] Date of Patent: Oct. 18, 1988

[54] TRACTOR HITCH AND ADJUSTABLE ARM

[75] Inventors: David C. Koch; Thomas B. Tuttle, Woodridge, both of Ill.; Max A. Juengel, Grand Blanc, Mich.

[73] Assignee: J. I. Case Company, Racine, Wis.

[21] Appl. No.: 72,637

[22] Filed: Jul. 13, 1987

[51] Int. Cl.$^4$ ............................................. F16B 7/00
[52] U.S. Cl. .............................. 280/461 A; 280/482; 403/46; 411/205
[58] Field of Search ............... 280/482, 456 A, 460 A, 280/461 A; 403/43, 44, 45, 46, 47, 48; 411/205, 209, 216, 217

[56] References Cited

U.S. PATENT DOCUMENTS

| | | | |
|---|---|---|---|
| 1,245,095 | 10/1917 | Flood | 403/46 |
| 2,694,586 | 11/1954 | Smith | 403/46 |
| 2,878,043 | 3/1959 | Edman et al. | 403/46 |
| 2,920,912 | 1/1960 | Hess | 287/60 |
| 2,998,989 | 9/1961 | Silver et al. | 287/62 |
| 3,031,208 | 4/1962 | Abbott | 280/460 A |
| 3,053,552 | 9/1962 | Horney | 280/461 |
| 3,851,978 | 12/1974 | Kuipers | 403/45 |
| 3,989,394 | 11/1976 | Ellis | 403/46 |
| 4,025,207 | 5/1977 | Johnson, Jr. | 403/46 |
| 4,034,999 | 7/1977 | Jackson | 280/461 A |
| 4,194,757 | 3/1980 | Lucas et al. | 280/461 A |
| 4,418,583 | 12/1983 | Taig | 74/501.5 R |
| 4,418,935 | 12/1983 | O'Connor | 280/461 A |

FOREIGN PATENT DOCUMENTS

| | | | |
|---|---|---|---|
| 311269 | 3/1919 | Fed. Rep. of Germany | 403/46 |
| 153142 | 11/1920 | United Kingdom | 403/46 |

Primary Examiner—John J. Love
Assistant Examiner—Charles R. Watts
Attorney, Agent, or Firm—Peter N. Jansson, Ltd.

[57] ABSTRACT

A multi-arm tractor hitch with an improved adjustable arm having a pair of threaded end members with slots therealong, a middle member engaged with the end members in turnbuckle fashion, a locking member movably, preferably pivotably, attached to the middle member and having tabs positioned to engage the slots of both ends members when the locking member is in a lock position, to firmly lock them and the middle against relative rotation without any connection beyond the middle member.

17 Claims, 2 Drawing Sheets

TRACTOR HITCH AND ADJUSTABLE ARM

FIELD OF THE INVENTION

This invention is related generally to rigid link arms having means for length adjustment and, more particularly, to tractor hitch mechanisms, such as the common three-point hitch mechanism, with a plurality of arms at least one of which is adjustable in length.

BACKGROUND OF THE INVENTION

Three-point hitch mechanisms of the type used on tractors for attachment of various trailing implements frequently require adjustment in the lengths of one or more of their arms to accommodate a particular implement or to adjust for varying operating conditions. Three-point hitch mechanisms typically include an upper link arm which is adjustable in length.

Many different rigid arms with adjustable lengths have been developed over the years for tractor hitch mechanisms and the like. Among such prior hitches and adjustable arms are those disclosed in the following United States patents:

U.S. Pat. No. 4,418,935 (O'Connor)
U.S. Pat. No. 4,034,999 (Jackson)
U.S. Pat. No. 3,053,552 (Horney)
U.S. Pat. No. 2,878,043 (Edman et al.)
U.S. Pat. No. 2,920,912 (Hess)
U.S. Pat. No. 4,194,757 (Lucas et al.)
U.S. Pat. No. 2,998,989 (Silver et al.)
U.S. Pat. No. 3,989,394 (Ellis)
U.S. Pat. No. 1,245,095 (Flood)
U.S. Pat. No. 3,851,978 (Kuipers)
U.S. Pat. No. 4,418,583 (Taig)

The adjustable arms and hitches of the prior art have certain problems and disadvantages. Certain adjustable arms generally of the turnbuckle type, that is, having right-hand and left-hand threaded end members coaxially joined to a rotatable middle member, have inadequate means for locking after adjustment in length. In some cases, only one of the threaded engagements of an end member to the middle member is locked, or separate locking mechanisms are required for the two threaded engagements. Complex locking devices are often used and multiple locking steps are often required.

In certain situations, one or more elements of a locking structure extend well beyond at least one of the ends of the middle member in order to engage something which serves as an anchor against rotational movement.

The operation of some devices may not only be complex in structure and operation, but difficult to understand. In many cases operators may have to resort to their tool chests when adjusting the lengths of such adjustable arms. This may be necessary for turning the middle member or for unlocking or locking it.

There is a need for an improved multi-arm hitch apparatus and for an improved adjustment and locking means for rigid link arms of adjustable length. In particular, there is a need for a simple adjustment means to firmly lock both end portions and the middle portion of turnbuckle-type adjustable arms using a single locking piece and single locking movement. There is a need for such an adjustment means which is self-contained, that is, free of locking structures extending beyond the ends of the middle member. There is a need for a link arm with these advantages which may be easily adjusted by hand, without using tools.

OBJECTS OF THE INVENTION

It is an object of this invention to provide an improved multi-arm hitch apparatus overcoming some of the problems and shortcomings of the prior art.

Another object of this invention is to provide a hitch apparatus having an improved adjustable arm.

Another object of this invention is to provide an improved rigid link arm adjustment and locking mechanism which is simple in construction and easy to operate.

Another object of this invention is to provide an improved rigid link arm of the turnbuckle type all coaxial parts of which may be locked against relative rotation by a single locking member and with a single locking movement.

Another object of this invention is to provide an improved rigid link arm of the turnbuckle type having a middle turnbuckle member with a self-contained locking device for the threaded engagements of both turnbuckle end members.

Another object of this invention is to provide an improved rigid link arm of the turnbuckle type which may be rigidly locked without the use of any structure extending beyond the ends of the middle turnbuckle member.

Another object of this invention is to provide an improved rigid link arm of adjustable length having a locking mechanism with a single member for locking more than two relativly rotatable coaxial parts and which also provides a handle for easy length adjustment.

These and other important objects will be apparent from the descriptions of this invention which follow.

SUMMARY OF THE INVENTION

This invention is an improved tractor hitch apparatus of the type having a plurality of arms, at least one of which has adjustable length, extending from the tractor toward hitch points. The invention overcomes certain problems of the prior art and provides a combination of advantages not available in prior devices.

The adjustable arm of this invention is of the turnbuckle type, that is, having a pair of end members with threaded male portions extending toward each other and terminating in spaced inner ends, and a middle member having threaded female portions at its opposite ends adjustably receiving the male portions of the end members. As in other turnbuckles, the end members and middle member are in coaxial threaded engagement with right-hand threads for one end member and left-hand threads for the other.

Each of the end members has a slot extending along it, preferably in a direction parallel to the axis of the adjustable arm. An elongated locking member is movably attached to the middle member and has slot-engagement means for engaging the slots of both end members. The slot-engagement means are projections (tabs) sized to fit within the slots to lock the end members in fixed rotational positions with respect to the middle member.

The locking members are of sufficient length to span the distance between the inner ends of the threaded male portions of the two end members and to overlap them sufficiently to allow concurrent engagement of the slot-engagement means with the slots of both end members, regardless of the length of the arm. Thus, both end members are locked by one piece and one locking motion to the middle member. And, such dual locking is provided without any member extending beyond the end of the middle member to be anchored at a remote point.

The locking member is movable between a lock position in which it extends along the middle member, preferably parallel to the middle member, such that the slot-engagement means are within the slots, as previously described, and a free position in which the slot-engagement means are removed from such slots. When the locking member is in its lock position, it is held in that position by a holding means secured to the middle member.

In highly preferred embodiments, the locking member has a proximal end hinged to the middle member at a position adjacent to one of the end members and a distal end which extends, when in the lock position, to a position adjacent to the other end member. This provides the aforementioned overlapping.

The slot-engagement means preferably includes a pair of radially extending projections (tabs) affixed to the locking member near its proximal and distal ends. The middle member, which preferably is a generally cylindrical member, defines a corresponding pair of radial apertures positioned to receive the tabs when the locking member is in the lock position. The tabs extend through such apertures and into the slots on the end members.

The middle member preferably includes proximal and distal end brackets which are affixed thereto in position to be adjacent to the proximal and distal ends, respectively, of the locking member when it is in its lock position. The hinging of the locking member, previously mentioned, is to the proximal end bracket. The holding means, previously mentioned, which maintains the locking member in its lock position, is preferably secured to the distal end bracket and is in position to engage the distal end of the locking member. An easily removable pin, such as a large cotter pin, is a preferred holding member.

In its free position, which extends away from the middle member of the adjustable arm, the locking member can serve as a means to turn the middle member and thus adjust the length of the adjustable arm. Its position allows substantial leverage to allow easy rotation of the middle member without the use of tools, even though non-use, time and dirt may otherwise make rotation difficult.

The hinging of the locking member to the middle member is preferably arranged such that the locking member pivots within a radial plane. Such arrangement makes the adjustment and locking means of this invention particularly easy to understand and operate. And, in such preferred arrangement the locking member can be pivoted readily to a position perpendicular to the axis of the arm, which is particularly helpful in obtaining leverage for adjustment of the arm length.

While the adjustable link arm of this invention is preferably the top link arm of a multi-arm hitching mechanism, such as a three-point hitch, it may be used in another position in hitch mechanisms or in other applications requiring rigid links of adjustable length.

DETAILED DESCRIPTIONS OF PREFERRED EMBODIMENTS

Figure 1:
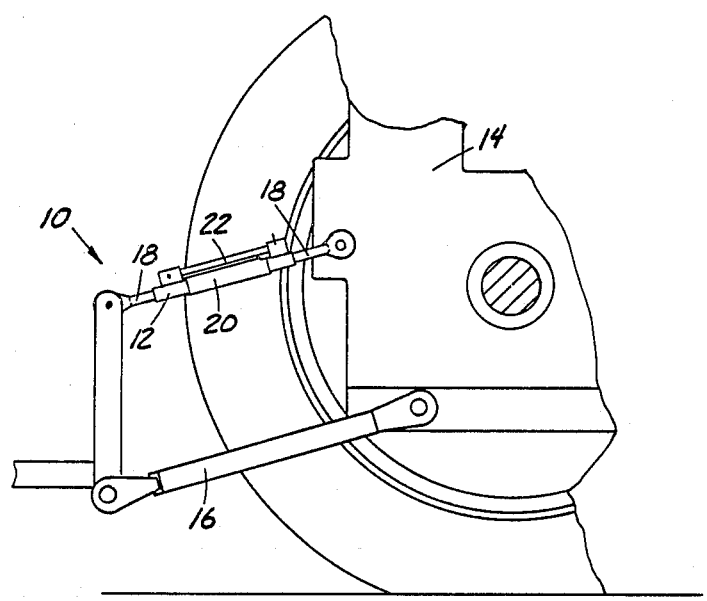
FIG. 1 is a fragmentary side sectional view of a tractor illustrating a hinge apparatus in accordance with a preferred embodiment of this invention.

The figures illustrate preferred hitch apparatus 10 in accordance with this invention, having an improved adjustable top link 12. Hitch apparatus 10, attached to the rear end of tractor 14, is a three-point hitch having a plurality of arms including adjustable arm 12 and a pair of lower arms 16. Hitch apparatus 10 is moved by hydraulic means not shown. The adjustment of the length of top link 12 is a manual operation.

Adjustable arm 12 has a pair of threaded end members 18, a middle member 20 in coaxial threaded engagement with end members 18, an elongated locking member 22 movably attached to middle member 20, and a removable pin 24 which serves as a means to hold locking member 22 in a lock position against middle member 20.

End members 18 have threaded male portions 26 which extend toward each other and terminate in spaced inner ends 28. Threaded male portions 26 have slots 30 extending along their lengths in a direction parallel to the axis of adjustable arm 12. Slots 30 extend in a radial direction preferably to a depth greater than the depth of the threads.

Each end member 18 has two slots 30 circumferentially spaced by 180°. While two slots 30 are preferred for each end member, a single slot is acceptable as are three or more slots. The number of slots determines how small the length adjustments may be between rotational locking positions. Only one slot on each end member 18 is used at any one time for locking.

Middle member 20 is generally cylindrical in shape and has threaded female portions 32 at its opposite ends which threadedly receive male portions 26 of end members 18 in turnbuckle fashion. That is, the threaded juncture of one end member 18 with middle member 20 has right-hand threads, while the threaded juncture of the other end member 18 with middle member 20 has left-hand threads. Turning of middle member 20 in one direction shortens the length of adjustable arm 12, while turning it in the opposite direction lengthens adjustable arm 12.

Locking member 22 is an elongated bar. It has a proximal end 34, which is pivotably attached to middle member 20, and a distal end 36. Locking member 22 is nearly as long as middle member 20. Proximal end 34 is on middle member 20 at a position adjacent to one of the end members 18, and when locking member 22 is in the lock position, its distal end 36 is on middle member 20 at a position adjacent to the other end member 18.

Locking member 22 includes a pair of axially spaced tabs (or slot-engagement means) 38 extending therefrom in a radial direction. One of the tabs 38 is near proximal end 34 while the other is near distal end 36. Tabs 38 are affixed to locking member 22 by welding or otherwise. Tabs 38 are sized for insertion into slots 30.

Middle member 20 includes a proximal end bracket 40 and a distal end bracket 42, which are affixed to the main cylindrical portion of middle member 20 in positions adjacent to proximal and distal ends 34 and 36, respectively, of locking member 22 when locking member 22 is in its lock position parallel to and against middle member 20. End brackets 40 and 42 are three-sided walls surrounding and receiving proximal and distal ends 34 and 36.

Figure 2:
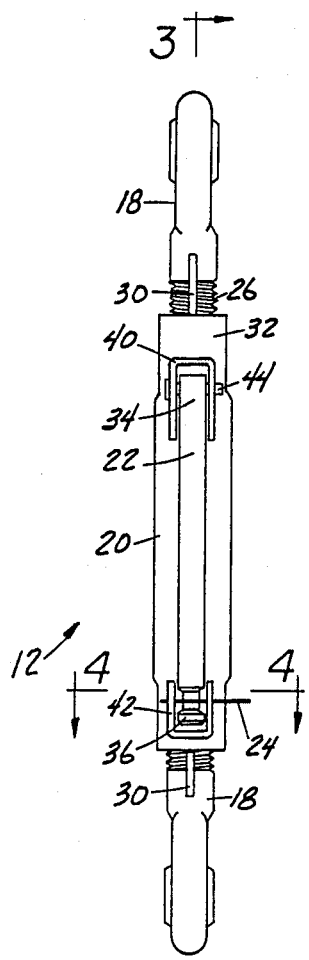
FIG. 2 is an enlarged top view of the adjustable upper link arm of the hinge illustrated in FIG. 1.

The pivotable attachment of locking member 22 to middle member 20 is by means of a pivot pin 44 which extends across proximal end bracket 40 and through a pin opening in proximal end 34. The pivoting arrangement of locking member 22 with middle member 20 allows locking member 22 to pivot in a radial plane between the lock position illustrated by full lines in FIGS. 2 and 3, in which locking member 22 is adjacent to and parallel with middle member 20, and a free position illustrated by phantom lines in FIG. 3, in which locking member 22 is substantially perpendicular to middle member 20.

Figure 4:
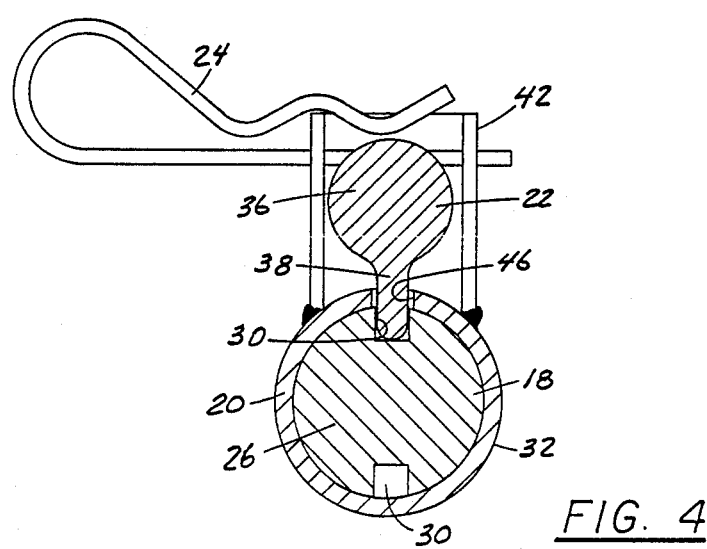
FIG. 4 is a further enlarged fragmentary sectional view taken along section 4—4, as indicated in FIG. 2.

Middle member 20 has radial apertures 46 positioned thereon to receive tabs 38 when locking member 22 is in its lock position. This is illustrated best in FIGS. 3 and 4. In the lock position, tabs 38 extend completely through radial apertures 46 and into slots 30, thus preventing relative rotational movement of both end members 18 and middle member 20. Slots 30 are of sufficient lengths that this locking action is possible for any adjustment in length of adjustable arm 12.

When in the lock position, removable pin 24 holds distal end 36 against middle member 20. Pin 24 extends through openings (not shown) in distal end bracket 42 and across a necked in portion 48 of distal end 36. Removable pin 24 is preferably a large cotter pin which is easily inserted and removed for adjustment in the length of adjustable arm 12.

Figure 3:
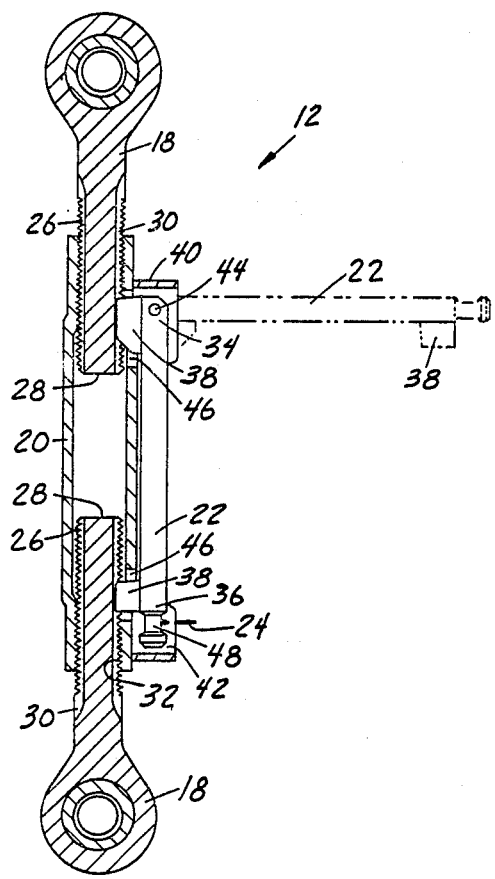
FIG. 3 is a sectional view taken along section 3—3, as indicated in FIG. 2, showing the locking member in full lines in the lock position and showing it in phantom lines in the free position which allows rotation for adjustment.

In the free position, illustrated by phantom lines in FIG. 3, locking member 22 becomes a useful handle to aid in the turning of middle member 20 and thus in the adjustment of the length of adjustable arm 12. Its length gives substantial leverage to turn middle member 20 even though the threaded engagements may not otherwise be turning freely. In this manner, adjustable arm 12 may be readily adjusted without the use of any pipe wrench or tools.

When hitch apparatus 10 is not in use, locking member 22 may be moved into its free position and used to support adjustable arm 12 in some desirable position. Distal end 36 of locking member 22 is available for this purpose, and is adapted to engage one or more securing means not shown.

Middle member 20 and locking member 22 cooperate with end members 18 to provide a firm locking of all turnbuckle parts against rotational movement No structural element extends beyond the ends of middle member 20 to engage any remote structure. The adjustment and locking structure of this invention is integral with the normal middle turnbuckle member and independent of other structure.

The particular pivoting arrangement of locking member or bar 22 which is shown in the drawings is highly preferred. However, other forms of movable attachment of locking member 22 to middle member 20 are possible, including an arrangement in which tabs 38 move into and out of engagement with slots 30 by virtue of parallel movement of locking member 22 toward and away from middle member 20. Other arrangements are possible as well.

The hitch apparatus and adjustable arm of this invention may be made using well-known available materials and components.

While the principles of this invention have been described in connection with specific embodiments, it should be understood clearly that these descriptions are made only by way of example and are not intended to limit the scope of the invention.

What is claimed:

1. In hitch apparatus of the type having a plurality of arms, at least one with adjustable length, extending from a tractor, the improvement wherein the adjustable arm comprises:
   two threaded end members along an axis, each with a slot therealong;
   a middle member in coaxial threaded engagement with the end members in turnbuckle fashion;
   an elongated locking member movably attached to the middle member and having tabs spaced thereon, the locking member movable between a lock position along the middle member in which the tabs are in the slots of both end members and a free position in which the tabs are out of the slots, the locking member extending substantially the full length of the middle member from a proximal end, which is hinged by a pivot at said proximal end to the middle member at a position adjacent to one of the end members, to a distal end which in the lock position is adjacent to the other of the end members, the tabs including one tab near the distal end and one tab by the pivot near the proximal end, the locking member offset to and pivotable on only one radial side of the middle member; and
   means secured to the middle member for holding the locking member in the lock position.

2. The hitch apparatus of claim 1 wherein the locking member is pivotable in a radial plane.

3. The hitch apparatus of claim 1 wherein the middle member is a generally cylindrical member defining radial apertures to receive the tabs.

4. The hitch apparatus of claim 3 wherein the middle member includes a proximal end bracket and a distal end bracket in positions to be adjacent to the proximal and distal ends, respectively, of the locking member when in its lock position.

5. The hitch apparatus of claim 4 wherein the locking member is hinged to the proximal end bracket.

6. The hitch apparatus of claim 4 wherein the holding means is secured to the distal end bracket in position to engage the distal end of the locking member.

7. In a hitch apparatus of the type having a plurality of arms, at least one with adjustable length, extending from a tractor, the improvement wherein the adjustable arm comprises:
   a pair of end members along an axis having threaded male portions which extend toward each other and terminate in spaced inner ends, the male portions having slots extending therealong;
   a middle member having threaded female portions at its opposite ends adjustably receiving the male portions in turnbuckle fashion;
   an elongated lockig member movably attached to the middle member and having tabs spaced thereon, the locking member movable between a lock position along the middle member in which the tabs are in the slots of both end members and a free position in which the tabs are out of slots, the locking member extending substantially the full length of the middle member from a proximal end, which is hinged by a pivot at said proximal end to the middle member at a position adjacent to one of the end members, to a distal end which in the lock position is adjacent to the other of the end members, the tabs including one tab near the distal end and one tab by the pivot near the proximal end, the locking member offset to and pivotable on only one radial side of the middle member; and means secured to the middle member for holding the locking member in the lock position.

8. The hitch apparatus of claim 7 wherein the locking member is pivotable in a radial plane.

9. The hitch apparatus of claim 8 wherein the middle member is a generally cylindrical member defining radial apertures to receive the tabs.

10. The hitch apparatus of claim 9 wherein the middle member includes a proximal end bracket and a distal end bracket in positions to be adjacent to the proximal and distal ends, respectively, of the locking member when in its lock position.

11. The hitch apparatus of claim 10 wherein the locking member is hinged to the proximal end bracket.

12. The hitch apparatus of claim 10 wherein the holding means is secured to the distal end bracket in position to engage the distal end of the locking member.

13. A turnbuckle mechanism comprising:
two threaded end members along an axis, each with a slot therealong;
a middle member in coaxial threaded engagement with the end members;
an elongated locking member movably attached to the middle member and having tabs spaced thereon, the locking member movable between a lock position along the middle member in which the tabs are in the slots of both end members and a free position in which the tabs are out of the slots, the locking member extending substantially the full length of the middle member from a proximal end, which is hinged by a pivot at said proximal end to the middle member at a position adjacent to one of the end members, to a distal end which in the lock position is adjacent to the other of the end members, the tabs including one tab near the distal end and one tab by the pivot near the proximal end, the locking member offset to and pivotable on only one radial side of the middle member; and
means secured to the middle member for holding the locking member in the lock position.

14. The turnbuckle mechanism of claim 13 wherein the middle member is a generally cylindrical member defining radial apertures to receive the tabs.

15. The turnbuckle mechanism of claim 14 wherein the middle member includes a proximal end bracket and a distal end bracket in positions to be adjacent to the proximal and distal ends, respectively, of the locking member when in its lock position.

16. The turnbuckle mechanism of claim 15 wherein the locking member is hinged to the proximal end bracket.

17. The turnbuckle mechanism of claim 15 wherein the holding means is secured to the distal end bracket in position to engage the distal end of the locking member.

* * * * *

UNITED STATES PATENT AND TRADEMARK OFFICE
CERTIFICATE OF CORRECTION

PATENT NO. : 4,778,194

DATED : October 18, 1988

INVENTOR(S) : David C. Koch, Thomas B. Tuttle and Max A. Juengel

It is certified that error appears in the above-identified patent and that said Letters Patent is hereby corrected as shown below:

In column 2, line 30, change "relativly" to --relatively--.

In column 4, line 13, after "illustrate", insert --a--.

In column 5, line 32, change "necked in" to --necked-in--.

In column 5, line 54, change "movement" to --movement.--.

In column 6, line 3, add the following sentence after the word "components." --Steel construction is highly preferred.--

In column 6, line 51, after "In", delete --a--.

In column 6, line 67, after "out of", insert --the--.

In column 7, line 9, the subparagraph should end with "member; and", and the portion which follows, beginning with "means secured to", should be a new subparagraph.

Signed and Sealed this

Twenty-first Day of March, 1989

*Attest:*

DONALD J. QUIGG

*Attesting Officer*     *Commissioner of Patents and Trademarks*